United States Patent [19]
Maffia et al.

[11] 3,831,687
[45]* Aug. 27, 1974

[54] FLEXURE BASE SCALE

[75] Inventors: Doro Maffia, Santa Rosa; Linus G. Schwartz, Ronnert Park, both of Calif.

[73] Assignee: National Controls, Inc., Santa Rosa, Calif.

[ * ] Notice: The portion of the term of this patent subsequent to May 30, 1989, has been disclaimed.

[22] Filed: May 26, 1972

[21] Appl. No.: 257,449

Related U.S. Application Data
[62] Division of Ser. No. 54,473, July 13, 1970.

[52] U.S. Cl............. 177/210, 177/257, 177/DIG. 9
[51] Int. Cl. ................. G01g 3/14, G01g 21/08
[58] Field of Search............ 177/50, 180, 256–258, 177/DIG. 3, DIG. 9, 210, 211

[56] References Cited
UNITED STATES PATENTS

| | | | |
|---|---|---|---|
| 278,905 | 6/1883 | Emery | 177/180 |
| 2,766,981 | 10/1956 | Lauler et al. | 177/211 |
| 3,163,247 | 12/1964 | Bell et al. | 177/DIG. 3 |
| 3,565,194 | 2/1971 | Engle et al. | 177/50 |

*Primary Examiner*—George H. Miller, Jr.
*Attorney, Agent, or Firm*—Flehr, Hohbach, Test, Albritton & Herbert

[57] ABSTRACT

Scale in which force applied to a platform is transmitted to a transfer lever arm through flexure plates. In one embodiment, the transfer arm is connected to a load cell which produces an electrical signal which actuates digital means to provide a digital indication of the weight of an object on the platform. In other embodiments the transfer arm bears against a hydraulic load cell which is connected to a pressure gauge or digital display means for indicating the weight of an object on the platform.

5 Claims, 10 Drawing Figures

3,831,687
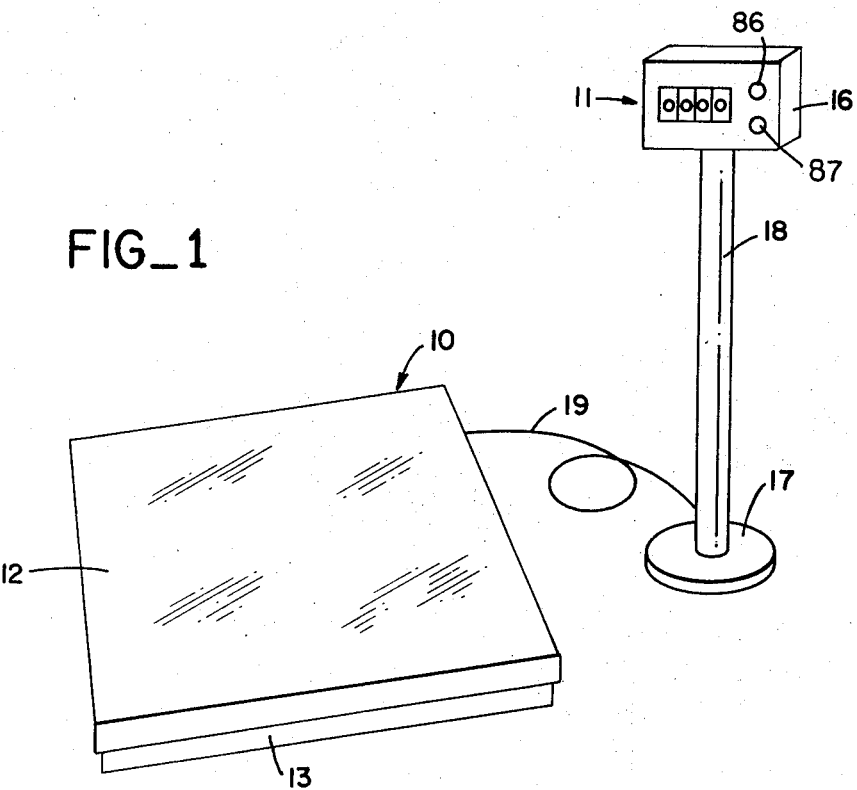
FIG_1
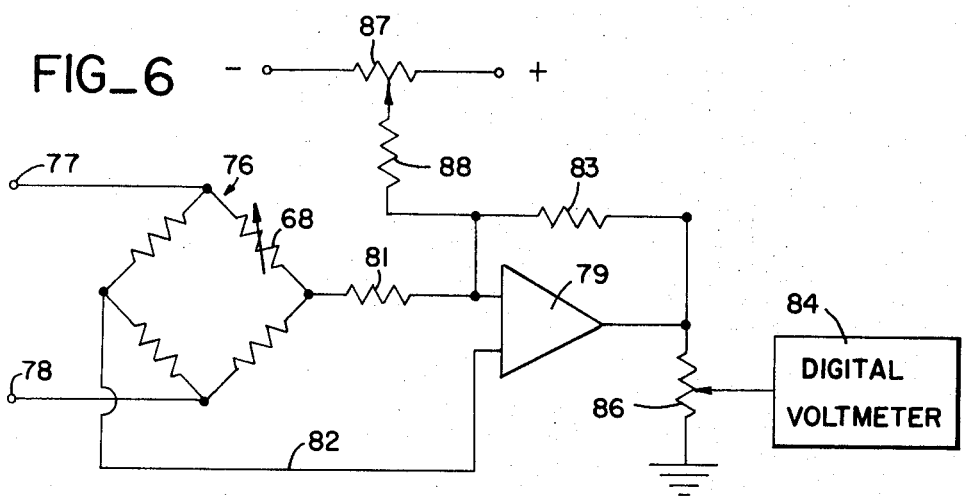
FIG_6

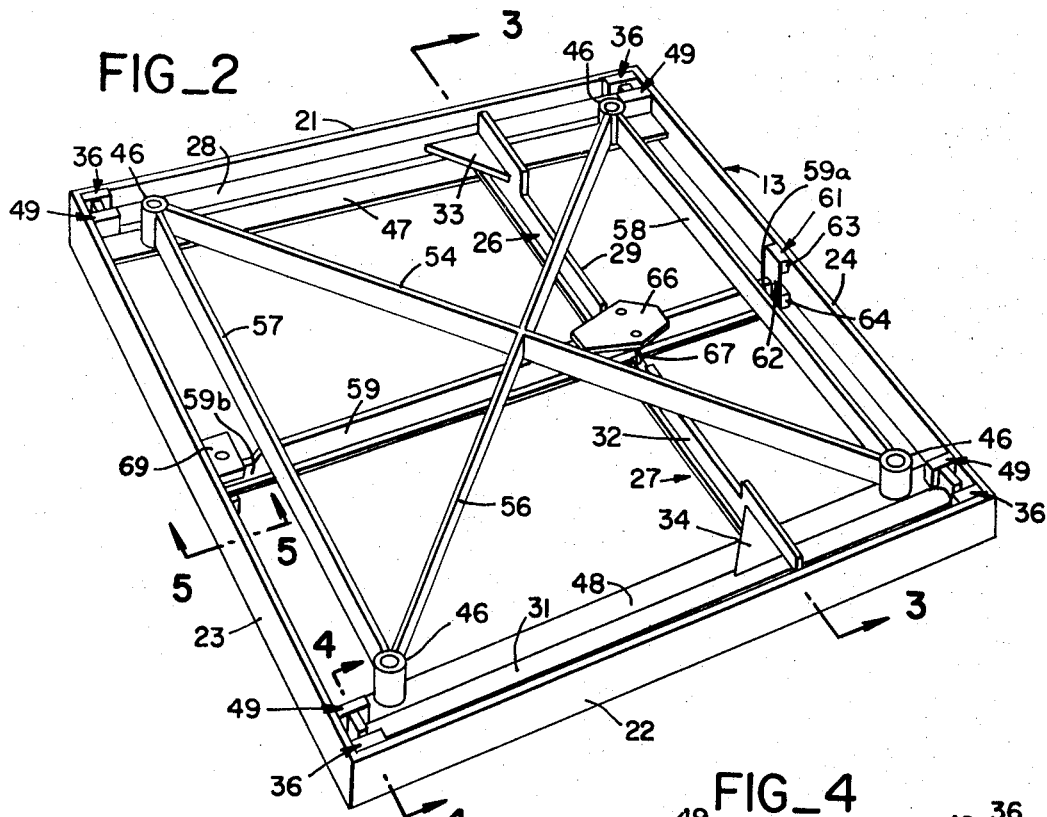
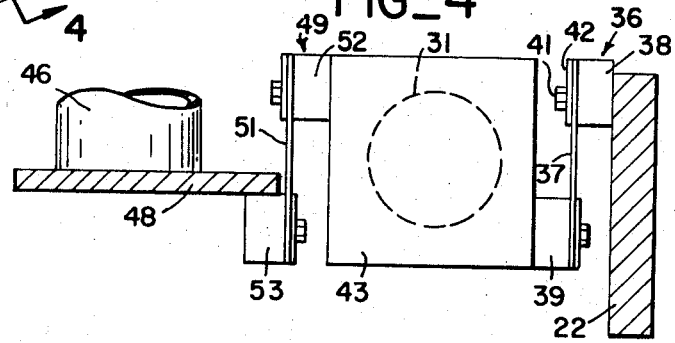
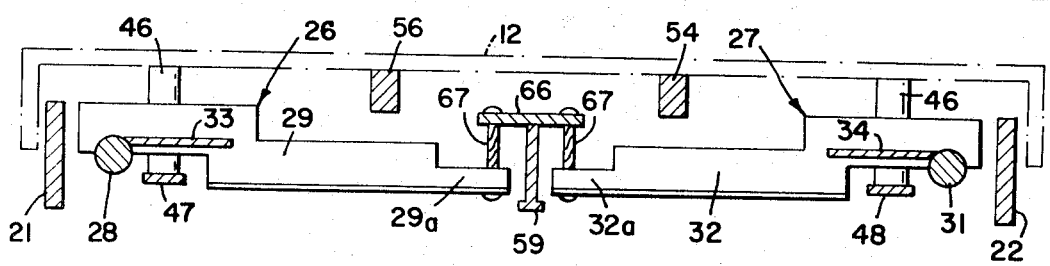

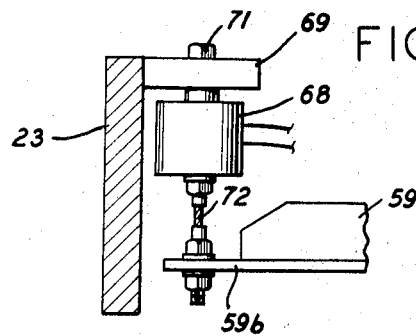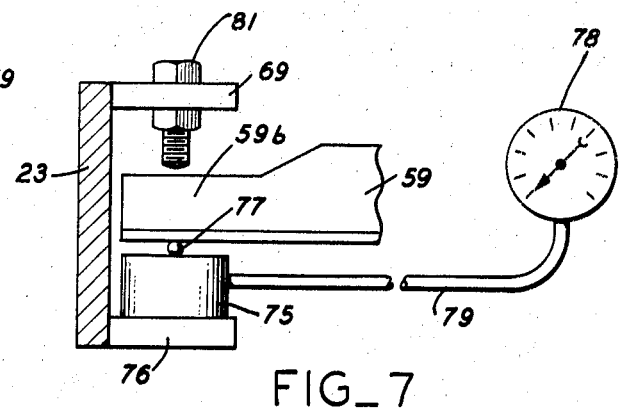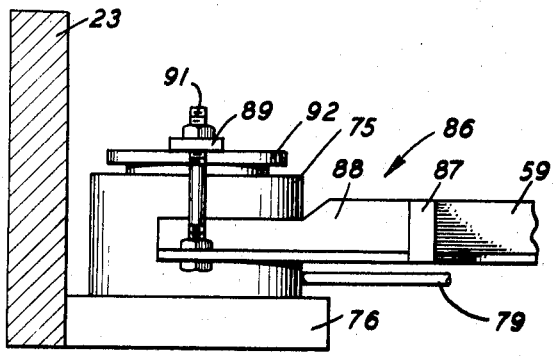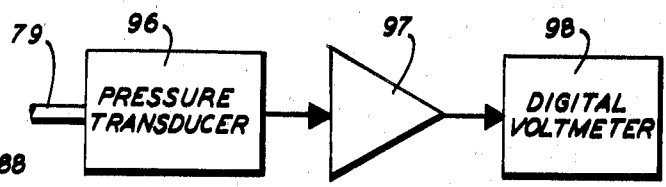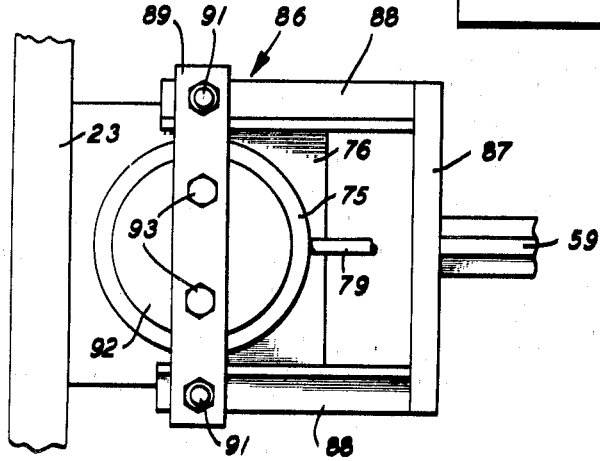

FLEXURE BASE SCALE

This is a division of application Ser. No. 054473 filed July 13, 1970.

BACKGROUND OF THE INVENTION

This invention pertains generally to weighing apparatus and more particularly to a scale of the type utilizing flexure plates for pivots or fulcrums.

Most scales heretofore provided utilize conventional knife-edges as pivots or fulcrums for platform levers and the like. These knife-edges have many well known disadvantages. For example, they must be formed and mounted within extremely close tolerances. They are generally fabricated of hardened materials, but nevertheless they tend to wear and corrode with use, thereby introducing inaccuracies into the measurements of the scale. Further inaccuracies are introduced by shrinkage and warpage of the structure in which the knife-edges are mounted, and inherent friction between the knife-edge and bearing surfaces limits precision of measurement. Also, in scales utilizing knife-edges, rocking or swaying of the platform is a common problem.

Heretofore, some efforts have been made at replacing the knife-edges of conventional scales with flexible members such as plates, straps, and cables. However, none of these attempts has provided entirely satisfactory results.

There is, therefore, a need for a new and improved scale which overcomes the foregoing and other problems encountered with scales heretofore provided.

SUMMARY AND OBJECT OF THE INVENTION

The flexure base scale of the present invention includes a pair of main lever arms pivotally mounted on a rectangular framework by means of flexure plates. The main lever arms are connected to a transfer lever arm by means of flexible cables or flexure plates, and one end of the transfer lever arm is pivotally mounted to the framework by another flexure plate. The platform of the scale is connected to the main lever arms through additional flexure plates, with main lever arms acting as second class levers, so that downward deflection of the platform causes a corresponding downward deflection of the main lever arms and transfer lever arm. The free end of the transfer lever arm is connected to a load cell. In one embodiment, the load cell comprises an electrical device which is connected to electrical signal conditioning means digital display means for indicating the weight of an object placed on the platform of the scale. In another embodiment, the load cell is a hydraulic unit which is a hydraulic device which is connected to a pressure gauge for indicating the weight of the object.

It is in general an object of the present invention to provide a new and improved flexure base scale.

Another object of the invention is to provide a scale of the above character which includes digital display means for indicating the weight of an object placed on the platform of the scale.

Another object of the invention is to provide a scale of the above character in which the display means is mounted in a housing independent of the weighing platform so there is no structure near the platform to interfere with the placement of objects thereon.

Additional features and objects of the invention will be apparent from the following description in which the preferred embodiments are set forth in detail in conjunction with the accompanying drawings.

BRIEF DESCRIPTION OF THE DRAWINGS

FIG. 1 is a perspective view of one embodiment of a flexure base scale incorporating the present invention.

FIG. 2 is a perspective view of the base portion of the scale shown in FIG. 1 with the platform removed for clarity.

FIG. 3 is a cross-sectional view, taken along line 33 in FIG. 2, illustrating the inner connection of the main and transfer lever arms.

FIG. 4 is an enlarged cross-sectional view, taken along line 44 in FIG. 2, illustrating the use of flexure plates for pivotally mounting the main lever arms.

FIG. 5 is an enlarged cross-sectional view, taken along line 55 of FIG. 2, illustrating an electrical load cell connected to the free end of the transfer lever arm.

FIG. 6 is a circuit diagram of one embodiment of a circuit for providing a digital display of the weight of an object on the scale platform in response to the pressure exerted on the load cell by the transfer arm.

FIG. 7 illustrates another embodiment incorporating the invention and having a hydraulic load cell and a pressure gauge for indicating the weight of an object on the platform of the scale.

FIG. 8 is an elevational view, partly sectioned, of the load cell portion of another embodiment of the invention utilizing a hydraulic load cell.

FIG. 9 is a top plan view of the portion of the embodiment illustrated in FIG. 8.

FIG. 10 is a block diagram, illustrating the use of a digital display with the embodiments utilizing hydraulic load cells.

DESCRIPTION OF THE PREFERRED EMBODIMENTS

In the embodiment illustrated in FIG. 1, the scale includes a base section 10 and a display section 11. The base section 10 includes a platform 12 mounted upon a framework 13 in a manner hereinafter described in detail. The display section includes means for providing a visual digital indication of the weight of an object placed upon the platform 12. The display section includes electronic circuitry mounted within a cabinet 16 supported by a base member 17 and an upright column 18. The base and display sections are innerconnected electrically by means of a cable 19. By housing the display and base sections separately, the display section can be located remotely of the base section. Since the display section can be moved away from the base section, the upright column 18 will not interfere with the weighing of objects of large size or unusual shape.

The framework 13 is a generally rectangular framework comprising side members 21, 22 and end members 23, 24. These members are fabricated of a rigid material, such as steel, and are joined together at their ends by conventional means, such as welding, to provide a rigid framework or base for the base section of the scale.

A pair of main lever assemblies, designated generally by the reference numerals 26 and 27, are disposed within the area defined by the framework 13. Each of the lever assemblies includes a fulcrum portion and a main lever arm which extends normally from the fulcrum portion. Thus, the lever assembly 26 includes a fulcrum portion 28 and a main lever arm 29, and the lever assembly 27 includes a fulcrum portion 31 and a lever arm 32. As illustrated, each of the fulcrum portions is a cylindrical member to which one end of its associated lever arm is rigidly secured by conventional means such as welding. The joints between the fulcrum portions and lever arms are strengthened by means of gusset plates 33, 34. The cylindrical fulcrum members can be solid or tubular, as desired. In the drawing, they are illustrated as solid members.

The fulcrum portions 28 and 31 are parallel and proximate to the side members 21 and 22, respectively, of the framework 13. The lever arms 29 and 32 are substantially equal in length. They extend inwardly from the fulcrum portions and framework side members, and their free ends 29a and 32a are proximate to the center line between the side members 21 and 22. For rigidity, each of the lever arms has a T-shaped cross-section.

Flexure means 36 is disposed between each of the fulcrum portions and side members for pivotally mounting the fulcrum portions to the side members. Each of the flexure means includes a relatively thin flexible plate 37 fabricated of a material such as stainless steel. These plates are generally rectangular in shape and are provided with blocks 38, 39 at their upper and lower ends, respectively to facilitate mounting. The flexible plates are secured to the block by means of bolts 41 and clamping plates 42. The upper blocks 38 are rigidly secured to the side members of the framework, as by welding. The lower blocks 39 are rigidly secured to the fulcrum portions 28, 31 through rigid rectangular plates 43 which are welded to the ends of the fulcrum portions and to the blocks 39.

The platform 12 is supported by four posts 46, rigid rail members 47 and 48, and additional flexure means 49. The platform rests in part upon the upper ends of the posts 46. The lower ends of these posts are secured to the rail members 47 and 48. These rail members extend parallel to the fulcrum portions of the main lever assemblies to which they are connected by the additional flexure means 49. These flexure means are similar to the flexure means 36, and each includes a flexible plate 51 and upper and lower mounting blocks 52 and 53, respectively. The upper blocks 52 are attached to the rectangular plates 43 at the end of the fulcrum portions, and the lower blocks 53 are attached to the rail members 47, 48. Thus, as will be apparent to those familiar with the art, the main lever assemblies 26, 27 function as second class levers. A load placed upon the platform 12 produces a slight downward deflection of the platform, which causes a slight pivotal movement of the fulcrum portions and a downward deflection of the free ends of the main lever arms.

Additional means is also provided for supporting the platform 12. This means includes a pair of diagonally extending braces 54, 56 and braces 57, 58 extending parallel to the end members of the framework. These braces are rigidly secured at their ends to the posts 46, and they are adapted for receiving the lower surface of the platform 12 on their upper surfaces.

A transfer lever arm 59 is pivotally mounted at one end 59a to the framework end member 24 by means of a flexure assembly 61. The flexure assembly 61 includes a flexure plate 62, similar to the flexure plate 37 and 51. The flexure plate 62 is attached to the end member 24 through an upper block 63. A lower block 64 provides support for the lower portion of the flexure plate 62 but does not contact the end member 24.

A plate member 66 is attached to the upper surface of the transfer lever arm 59 proximate to the free ends 29a and 32a of the main lever arms. Flexible cables 67 extend between the plate member 66 and free ends of the main lever arms. Thus, downward force on either of the main lever arms causes a corresponding downward force on the free end 59b of the transfer lever arm. If desired, thin flexure plates can be used instead of the cables 67.

The free end of the transfer lever 59 is disposed in proximity to the framework end member 23. Sensor means is provided for detecting the force at the free end 59b. This means includes a load cell 68 mounted on a block 69 which is secured to the upper central portion of the end member 23. The load cell is secured to the block 69 by a bolt 71 and connected to the end of the lever arm 59 by means of a flexible cable connector 72. Alternatively, if desired, the load cell 68 can be mounted below the free end of the transfer lever arm 59, with the end of the arm exerting a downward compressure force on the cell.

In one preferred embodiment, the load cell is a device using a strain gauge which has an electrical resistance dependent upon the tensive force applied to it through the cable 72. In another preferred embodiment, the load cell includes four strain gauges, two of which are placed in tension, the other two in compression by downward force of the lever arm 59.

As illustrated in FIG. 6, the load cell 68 is connected as one arm of a resistance bridge circuit 76. With load cells containing four strain gauges, each is connected in an arm of the bridge. A source of constant voltage is connected to the bridge circuit through input terminals 77 and 78. The output of this circuit is applied to the inverting and noninverting inputs of an operational amplifier 79 through a resistor 81 and conductor 82, respectively. A feedback resistor 83 is connected between the output and inverting input terminals of the operational amplifier to provide an amplifier of constant gain. The output of the operational amplifier is connected to a digital voltmeter 84 through a voltage divider consisting of potentiometer 86. This potentiometer provides means for adjusting the sensitivity of the voltmeter, and therefore, the correlation between the voltage displayed by the voltmeter and the weight of an object placed upon the platform of the scale. Means is also provided for adjusting the display means to read zero when there is no object upon the platform. This means includes a potentiometer 87 connected as a voltage divider across a source of direct current. The variable contact or wiper of the potentiometer is connected to the inverting input of the operational amplifier through a resistor 88.

In the preferred embodiment, the digital voltmeter 84 is of conventional design and includes a plurality of digital display elements, such as Nixie tubes, which provide a digital indication of the voltage connected to the input of the voltmeter. In the present invention, this voltage is dependent upon the weight of an object placed upon the platform of the scale.

Operation and use of the scale with the electrical load cell can now be described. In the absence of an object on the scale platform, the strain gauge(s) of load cell 68 has a certain value of electrical resistance. The potentiometer 87 is adjusted so that the voltage applied to the input terminals of the operational amplifier is zero in this condition. The output voltage of the operational amplifier is likewise zero, as is the voltage applied to the digital voltmeter 84.

When an object is placed upon the platform 12, the platform has a downward force. This force produces a pivotal movement of the fulcrum portions of the main lever arms 26, 27 and a corresponding downward force at the free ends of the main lever arms determined by the main lever ratio. The main lever arms acting through the plate 66 and cables 67 cause a downward force on the free end of the transfer lever arm 59. The free end 59b exerts a tensive force on the load cell 68, changing the electrical resistance of the strain gauge(s) therein to a value dependent upon the lever ratio of the arms 26, 27 and 59 and upon the force exerted upon the platform 12. In this situation, the voltage applied to the input terminals of the operational amplifier is no longer zero, but has a magnitude dependent upon the tension on the load cell and, hence, the weight of the object on the platform. The voltage at the output of the operational amplifier is applied to the input of the digital voltmeter through the potentiometer 86, and if this potentiometer has been adjusted correctly, the voltmeter will give a direct indication of the weight of the object on the platform.

FIG. 7 illustrates an embodiment of the invention in which a hydraulic load cell 75 is provided for detecting the force at the free end 59b of the transfer lever arm. This load cell is mounted on a block 76 which is secured to the lower central portion of the framework end member 23. This load cell comprises a hydraulic cylinder which is filled with fluid and a piston mounted on the cylinder which varies the pressure of the fluid according to the load. The free end 59b of the transfer lever arm is operably connected to the load cell piston through a ball 77 resting in sockets provided in the transfer lever arm and the load cell. A pressure gauge 78 is connected in fluid communication with the load cell cylinder through a hydraulic line 79. This pressure gauge is mounted externally of the base section of the scale and is calibrated in units of weight to provide a direct indication of the weight of an object on the platform. A stop member 81 is threadedly mounted in the block 69 and provides means for retaining the ball 77 in its sockets.

Operation of the embodiment of FIG. 7 the same as the operation of the embodiment previously described except for the manner in which the read-out is produced. When an object is placed upon the platform, the free end 59b of the transfer lever arm depresses the piston of the hydraulic load cell, increasing the pressure of the hydraulic fluid. This pressure is indicated by the gauge 78 in units of weight to provide a display of the weight of the object on the platform.

If desired, other types of devices can be used for indicating the force at the free end of the transfer lever arm and, hence, the weight of an object placed upon the platform.

FIGS. 8 and 9 illustrate another presently preferred embodiment utilizing a hydraulic load cell 75. As in the embodiment shown in FIG. 7, this load cell is mounted upon a block 76 which is secured to the lower central portion of the framework end member 23. However, in this embodiment the free end of the transfer lever arm 59 is connected to the load cell by means of a yoke assembly designated generally by the reference numeral 86. This yoke assembly includes a base member 87 rigidly secured to the lever arm 59 and a pair of arms 88 attached at one end to the base member 87 and extending in a direction generally parallel to the lever arm 59. A cross bar 89 extends between the free ends of the fingers 88 and is attached thereto by means of threaded studs 91. A circular plate assembly 92 is attached to the cross bar 89 by means of bolts 93. This plate assembly is also connected to the piston of the load cell.

As illustrated in FIG. 10, a digital display of the weight on the platform can be provided with the embodiments utilizing a hydraulic load cell. The output of the hydraulic load cell 75 is connected through the hydraulic line 79 to a pressure transducer 96 which produces an electrical output having a value dependent upon the pressure exerted by the fluid from the load cell. In one presently preferred embodiment, the pressure transducer 96 includes a flexible diaphragm and at least one strain gauge having an electrical resistance dependent on the pressure exerted on the diaphragm by the fluid from the load cell. The output of the transducer is applied to an amplifier 97 and then to a digital voltmeter 98 in a manner similar to that illustrated in FIG. 6.

In each of the embodiments disclosed the placing of an object on the platform of the scale produces an almost imperceptible deflection of the platform. As illustrated, the main lever arms 29, 32 are approximately 6.67 times the length of the spacing between the flexure means 36 and 49, and the length of the transfer lever arm 59 is approximately three times the distance between the cables 67 and the flexure assembly 61, giving an overall force multiplication on the order of twenty times. Thus, for example, a platform load of 1,500 pounds produces a force on the order of 75 pounds at the free end of the transfer lever arm. With conventional load cells, this force produces a deflection on the order of 0.0075 inches at the load cell and a platform deflection of only 0.000375 inches. Because of this very slight deflection, the flexure base scale of the present invention has been found to give unusually satisfactory results.

Since the two main lever arms 29, 32 are substantially equal in length, a given object produces the same force at the transfer lever arm regardless of where the object is placed on the platform. In order to maintain the ratio of lever arms constant, the centers of the fulcrum portions of the main lever arms, the flexible cables, and the load cell are all disposed in substantially the same horizontal plane.

Utilizing the present invention, a scale having a capacity on the order of 1,500 pounds can be built in a base having a height no greater than 4½ inches. Such a scale has sufficient sensitivity to detect changes in weight on the order of 2 ounces and is accurate to 0.1 percent or less of the full scale capacity.

It is apparent from the foregoing that a new and improved flexure base scale has been provided. The use of flexure plates eliminates the problems of wear, corrosion, alignment, and platform rock which limit the accuracy of scales using knife-edges. There are no pivots or bearings to wear out, and the digital weight display eliminates the problems of parallax and misreading encountered in conventional dial type scales. While only the presently preferred embodiments have been described herein, as will be apparent to those who are familiar with the art, certain changes and modifications can be made without departing from the scope of the invention as defined by the following claims.

We claim:

1. In a scale, a rigid framework, a platform for receiving a load to be weighed, a pair of levers, flexure plates connecting the levers to the framework, additional flexure plates connecting the platform to the levers for transmitting a load from the platform to the levers whereby the levers assume different positions according to the weight of the load, transducer means connected to at least one of said levers for providing an electrical signal corresponding to the weight of a load on the platform, and digital display means responsive to the electrical signal for indicating the weight of the load of the platform.

2. A scale as in claim 1 wherein the transducer means comprises a load cell having an electrical resistance corresponding to the force applied thereto.

3. A scale as in claim 1 wherein the display means includes a plurality of electrically energized light emitting digital display elements.

4. A scale as in claim 1 wherein the platform is surmounted on the framework and the transducer means comprises a load cell mounted on the framework under the platform.

5. A scale as in claim 1 wherein the display means is mounted in a housing independent of the framework and adapted to be located remotely thereof.

* * * * *